(12) United States Patent
Williams et al.

(10) Patent No.: US 10,562,383 B2
(45) Date of Patent: Feb. 18, 2020

(54) TONNEAU COVER WITH INTEGRAL TABLE AND BENCHES

(71) Applicant: Toyota Motor Engineering & Manufacturing North America, Inc., Plano, TX (US)

(72) Inventors: Paxton S. Williams, Milan, MI (US); Colby S. Williams, Milan, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 57 days.

(21) Appl. No.: 15/952,712

(22) Filed: Apr. 13, 2018

(65) Prior Publication Data
US 2019/0315211 A1 Oct. 17, 2019

(51) Int. Cl.
*B60P 7/02* (2006.01)
*B60J 7/14* (2006.01)
*B60J 7/10* (2006.01)
*A47B 85/06* (2006.01)
*A47B 3/14* (2006.01)
*A47B 3/08* (2006.01)
*A47B 83/02* (2006.01)
*B60J 7/19* (2006.01)

(52) U.S. Cl.
CPC .............. *B60J 7/141* (2013.01); *A47B 3/08* (2013.01); *A47B 3/14* (2013.01); *A47B 83/024* (2017.08); *A47B 85/06* (2013.01); *B60J 7/106* (2013.01); *B60J 7/198* (2013.01); *A47B 2200/004* (2013.01); *A47B 2200/005* (2013.01)

(58) Field of Classification Search
CPC ... B60J 7/141; B60J 7/102; B60J 7/198; B60J 7/104; B60P 7/02; B60P 7/04
See application file for complete search history.

(56) References Cited

U.S. PATENT DOCUMENTS

| | | | |
|---|---|---|---|
| 3,829,151 | A | 8/1974 | Fellenstein |
| 4,824,163 | A | 4/1989 | Hendrych |
| 5,368,354 | A | 11/1994 | Martin |
| 5,636,893 | A * | 6/1997 | Wheatley ................. B60J 7/141 16/354 |
| 5,857,729 | A * | 1/1999 | Bogard .................. B60J 7/1621 296/100.02 |
| 5,882,058 | A * | 3/1999 | Karrer ..................... B60J 7/141 280/748 |

(Continued)

*Primary Examiner* — Kiran B Patel
(74) *Attorney, Agent, or Firm* — Christopher G. Darrow; Darrow Mustafa PC

(57) ABSTRACT

A vehicle tonneau cover includes a first tonneau cover portion and a second tonneau cover portion positioned opposite the first tonneau cover portion. A connecting structure connects the first cover portion with the second cover portion. A third tonneau cover portion is coupled to the connecting structure so as to be securable in a first position to form a first configuration of the cover, and in a second position to form a second configuration of the cover. In the first configuration, the third cover portion resides between the first and second cover portions. In the second configuration, the third cover portion is spaced apart from the first and second cover portions so as to form a first gap between the third cover portion and the first cover portion and a second gap between the third cover portion and the second cover portion.

16 Claims, 10 Drawing Sheets

(56) References Cited

U.S. PATENT DOCUMENTS

| | | | | |
|---|---|---|---|---|
| 5,931,521 A | * | 8/1999 | Kooiker | B60J 7/141 296/100.09 |
| 5,961,173 A | * | 10/1999 | Repetti | B60J 7/141 296/100.01 |
| 6,082,806 A | * | 7/2000 | Bogard | B60J 7/141 296/100.06 |
| 6,183,035 B1 | * | 2/2001 | Rusu | B60J 7/1621 296/100.01 |
| 6,203,086 B1 | * | 3/2001 | Dirks | B60R 9/00 224/404 |
| 6,227,602 B1 | * | 5/2001 | Bogard | B60J 7/141 296/100.06 |
| 6,290,441 B1 | * | 9/2001 | Rusu | B60P 7/0807 296/100.07 |
| 6,299,232 B1 | * | 10/2001 | Davis | B60J 7/1621 292/DIG. 43 |
| 6,422,635 B1 | * | 7/2002 | Steffens | B60J 7/141 296/100.09 |
| 6,435,594 B1 | * | 8/2002 | Ekonen | B60J 7/041 296/100.09 |
| 6,439,639 B1 | * | 8/2002 | Branting | B60J 7/041 280/423.1 |
| 6,467,830 B1 | * | 10/2002 | Cortright | B60R 13/06 296/26.04 |
| 6,533,344 B1 | | 3/2003 | Patterson | |
| 6,572,174 B2 | * | 6/2003 | Hernandez | B60J 7/141 296/100.09 |
| 6,663,160 B2 | * | 12/2003 | Yarbrough | B60J 7/141 296/100.01 |
| 6,899,372 B1 | * | 5/2005 | Keller | B60J 7/141 296/100.06 |
| 6,902,222 B2 | * | 6/2005 | Nykiel | B60J 7/10 296/100.02 |
| 6,929,303 B1 | * | 8/2005 | Sharples | B60J 7/1621 296/100.05 |
| 7,278,674 B1 | * | 10/2007 | Bogard | B60J 7/1621 296/100.06 |
| 8,007,024 B2 | * | 8/2011 | Kealy | B60J 7/1614 296/100.02 |
| 9,004,571 B1 | * | 4/2015 | Bernardo | B60J 7/141 296/100.03 |
| 9,079,548 B1 | * | 7/2015 | Singer | B60R 11/06 |
| 9,393,855 B2 | * | 7/2016 | Rohr | B60J 7/1621 |
| 9,482,039 B1 | * | 11/2016 | Xu | E05D 5/14 |
| 9,815,358 B1 | * | 11/2017 | Quintus | B62D 33/046 |
| 9,895,963 B1 | * | 2/2018 | Spencer | B60J 7/141 |
| 10,384,522 B2 | * | 8/2019 | Yilma | B60J 7/141 |
| 10,414,257 B2 | * | 9/2019 | Facchinello | E05D 1/00 |
| 2001/0050494 A1 | * | 12/2001 | Rusu | B60J 7/1621 296/100.07 |
| 2002/0063438 A1 | * | 5/2002 | Rusu | B60J 7/1621 296/100.07 |
| 2002/0130527 A1 | * | 9/2002 | Henderson | B60J 7/141 296/37.6 |
| 2004/0195857 A1 | * | 10/2004 | Chverchko | B60J 7/1621 296/100.07 |
| 2004/0245799 A1 | * | 12/2004 | Rusu | B62D 25/10 296/100.06 |
| 2005/0029832 A1 | * | 2/2005 | Verduci | B60J 7/1621 296/100.06 |
| 2005/0093339 A1 | * | 5/2005 | Klassen | B62D 33/03 296/183.1 |
| 2006/0012211 A1 | * | 1/2006 | Keller | B60J 7/141 296/100.09 |
| 2006/0290165 A1 | * | 12/2006 | Grudek | B60R 9/00 296/136.12 |
| 2007/0035151 A1 | * | 2/2007 | Rusu | B60J 7/1621 296/100.01 |
| 2008/0100088 A1 | * | 5/2008 | Calder | B60J 7/141 296/100.09 |
| 2008/0116711 A1 | * | 5/2008 | Thacker | B60J 7/141 296/107.07 |
| 2009/0146449 A1 | * | 6/2009 | Steffens | B60J 7/141 296/100.07 |
| 2009/0189403 A1 | * | 7/2009 | Voglmayr | B60P 1/02 296/3 |
| 2009/0230718 A1 | * | 9/2009 | Getschel | B60J 7/1621 296/100.1 |
| 2010/0270824 A1 | * | 10/2010 | Yue | B60J 7/198 296/100.07 |
| 2011/0309651 A1 | * | 12/2011 | Hernandez | B60J 7/1621 296/100.08 |
| 2014/0117702 A1 | * | 5/2014 | Rossi | B60J 7/102 296/100.14 |
| 2014/0152046 A1 | * | 6/2014 | Facchinello | B60J 7/141 296/100.06 |
| 2015/0061315 A1 | * | 3/2015 | Facchinello | B60P 7/02 296/100.07 |
| 2015/0197141 A1 | * | 7/2015 | Cortez | B60J 7/141 296/3 |
| 2016/0114666 A1 | * | 4/2016 | Xu | B60J 7/141 296/100.07 |
| 2016/0200375 A1 | * | 7/2016 | Kerr, III | B60J 7/141 296/100.07 |
| 2016/0200376 A1 | * | 7/2016 | Kerr, III | B60P 7/02 296/100.07 |
| 2016/0340949 A1 | * | 11/2016 | Xu | E05D 5/14 |
| 2017/0210214 A1 | * | 7/2017 | Weltikol | B60J 7/141 |
| 2017/0291478 A1 | * | 10/2017 | Hall | B60J 7/198 |
| 2017/0327052 A1 | * | 11/2017 | Singer | B62D 33/023 |
| 2017/0361691 A1 | * | 12/2017 | Fuller | B60J 7/198 |
| 2018/0029454 A1 | * | 2/2018 | Freitas | B60P 7/0876 |
| 2018/0147925 A1 | * | 5/2018 | Williamson | B60J 10/90 |
| 2018/0201106 A1 | * | 7/2018 | Facchinello | B60J 7/196 |
| 2018/0312046 A1 | * | 11/2018 | Hutchens, III | B01J 37/0215 |
| 2019/0061498 A1 | * | 2/2019 | DeLong | B60J 7/198 |
| 2019/0084391 A1 | * | 3/2019 | Yilma | B25H 1/04 |
| 2019/0092149 A1 | * | 3/2019 | Facchinello | B60J 7/141 |
| 2019/0100088 A1 | * | 4/2019 | Facchinello | B60J 7/14 |
| 2019/0105975 A1 | * | 4/2019 | Yilma | B60J 7/141 |
| 2019/0168590 A1 | * | 6/2019 | O'Reilly | B60P 3/42 |
| 2019/0283684 A1 | * | 9/2019 | Singer | B60R 11/06 |

\* cited by examiner

TONNEAU COVER WITH INTEGRAL TABLE AND BENCHES

TECHNICAL FIELD

The embodiments described herein relate to covers for vehicle cargo beds and, more particularly, tonneau covers usable for covering a cargo bed of a pickup truck.

BACKGROUND

Pickup trucks may be used to transport various types of cargo. These trucks generally have a flat bed or floor near the rear of the vehicle, into which different types of cargo can be loaded. Users may wish to have a usable table and seating when they arrive at a destination. However, transporting a table and seating in the cargo bed may occupy valuable cargo space which could be used for other items. In addition, users at a location may have a sudden but unanticipated desire or need for a table and seating.

SUMMARY

In one aspect of the embodiments described herein, a tonneau cover structured to cover a cargo bed of a vehicle is provided. The tonneau cover includes a first tonneau cover portion and a second tonneau cover portion positioned opposite the first tonneau cover portion. A connecting structure connects the first tonneau cover portion with the second tonneau cover portion. A third tonneau cover portion is coupled to the connecting structure so as to be securable in a first position to form a first configuration of the tonneau cover and in a second position to form a second configuration of the tonneau cover, when the tonneau cover is mounted on the vehicle so as to cover the cargo bed. In the first configuration, the third tonneau cover portion resides between the first and second tonneau cover portions. In the second configuration, the third tonneau cover portion is spaced apart from the first tonneau cover portion and the second cover portion so as to form a first gap between the third cover portion and the first cover portion and a second gap between the third cover portion and the second cover portion.

In another aspect of the embodiments described herein, a tonneau cover structured to cover a cargo bed of a vehicle is provided. The tonneau cover includes a connecting structure. A first mounting flange is attached to the connecting structure and is structured to be mountable on a wall of the cargo bed when the tonneau cover is positioned on the vehicle so as to cover the cargo bed. A second mounting flange is attached to the connecting structure and is structured to be mountable on a wall of the cargo bed when the tonneau cover is positioned on the vehicle so as to cover the cargo bed. A first tonneau cover portion is rotatably coupled to the first mounting flange and a second tonneau cover portion is rotatably coupled to the second mounting flange. A third tonneau cover portion is coupled to the connecting structure so as to be movable in directions toward and away from the connecting structure. The first, second, and third tonneau cover portions are also coupled to the connecting structure so as to be positionable and securable with respect to each other to, in combination, form a planar surface mountable to walls of the cargo bed.

DETAILED DESCRIPTION

Figure 1:
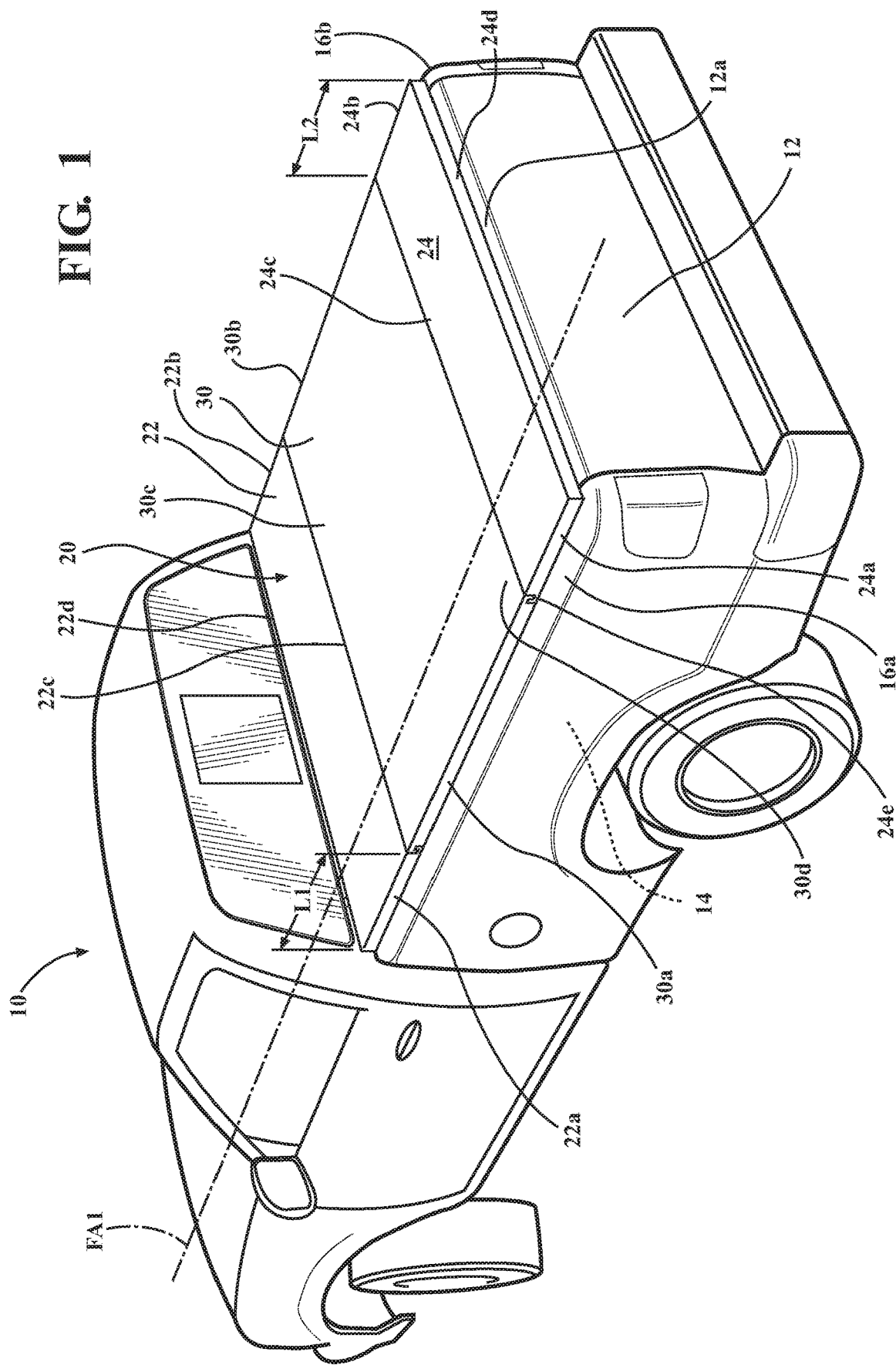
FIG. 1 is a perspective view of a rear portion of a vehicle incorporating a cargo bed suitable for coverage by a tonneau cover in accordance with an embodiment described herein.
Figure 2:
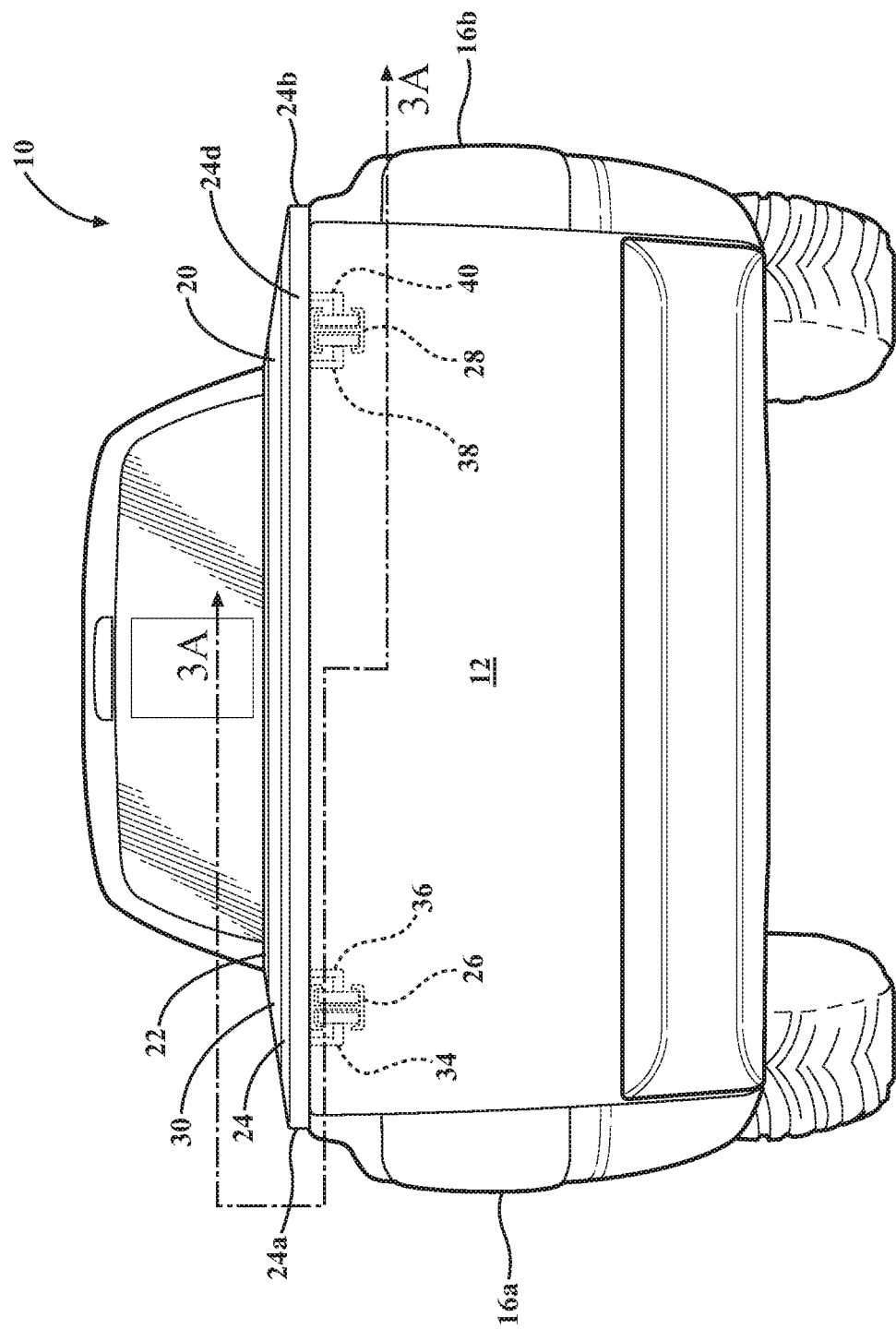
FIG. 2 is a rear view of the vehicle shown in FIG. 1.

The present disclosure describes embodiments of a tonneau cover structured to cover a cargo bed of a vehicle. The tonneau cover may include a first tonneau cover portion and a second tonneau cover portion positioned opposite the first tonneau cover portion. A first channel structure is coupled to, and extends between, the first tonneau cover portion and the second tonneau cover portion. A second channel structure is also coupled to, and extends between, the first tonneau cover portion and the second tonneau cover portion. The first and second channel structures may rigidly connect the first and second tonneau cover portions. A third tonneau cover portion is coupled to the first channel structure and the second channel structure so as to be securable in a first position to form a first configuration of the tonneau cover when the tonneau cover is mounted on the vehicle so as to cover the cargo bed. The third tonneau cover portion is also coupled to the first channel structure and the second channel structure so as to be securable in a second position to form a second configuration of the tonneau cover when the tonneau cover is mounted on the vehicle so as to cover the cargo bed. In the first configuration, the third tonneau cover portion resides between the first and second tonneau cover portions and is substantially planar with the first and second tonneau cover portions. In this configuration, the tonneau cover is in mountable on the walls and tailgate of the cargo bed to cover and seal the cargo bed. In the second configuration, the third tonneau cover portion is spaced apart from the first tonneau cover portion and the second cover portion so as to form a first gap between the third cover portion and the first cover portion and a second gap between the third cover portion and the second cover portion. In the second configuration, the third tonneau cover portion may be used as a table, and the first and second tonneau cover portions may be used as benches for seating by one or more occupants, who may pass their legs through the first and second gaps between the third tonneau cover portion and the first and second tonneau cover portions.

Description follows regarding a tonneau cover according to exemplary embodiments of the present invention with reference to FIGS. 1-7. Note that in the following description, the front, back, left, right, up, down, upper, and lower directions relating to the tonneau cover embodiments described herein indicate the front, back, left, right, up and down directions from the viewpoint of an occupant seated in the vehicle and facing toward a front of the vehicle when the tonneau cover is mounted on a vehicle so as to cover or overlie a vehicle cargo bed. Also, vertical and horizontal directions are defined with respect to a level road surface upon which the vehicle rests. That is, a horizontal direction or plane lies parallel to a level road surface upon which the vehicle rests, and a vertical direction or plane lies perpendicular to the horizontal direction or plane. The elements of the various tonneau cover embodiments may be fabricated from any material or materials suitable for the purposes described herein.

FIGS. 1-6 are views showing a tonneau cover in accordance with an embodiment described herein. FIG. 1 is a perspective view of a rear portion of a vehicle 10 incorporating a cargo bed 14 suitable for coverage by a tonneau cover 20 in accordance with the embodiment of the tonneau cover. In the embodiment shown in FIG. 1, vehicle 10 is in the form of a pickup truck, although a tonneau cover as described herein may be configured to be securable to any vehicle having a cargo bed suitable for coverage.

Referring to FIGS. 1-6, cargo bed 14 may be defined by a floor 15, a pair of opposed sidewalls 16a, 16b, a front wall 17, and a tailgate 12. Sidewalls 16a, 16b, front wall 17, and tailgate 12 may have top or uppermost surfaces 16a-1, 16b-1, 17a, and 12a, respectively, on which portion of the tonneau cover 20 may be mountable. Top surfaces 16a-1, 16b-1, 17a, and 12a may be coplanar to facilitate mounting of the tonneau cover 20 thereupon, to cover and seal the cargo bed 14 in a known manner from exposure to weather and dirt, for example.

Tailgate 12 may be rotatably attached to the body or frame of the vehicle 10 so as to be movable in a known manner between multiple angular orientations relative to the truck body or frame, to provide access to the cargo bed 14. For example, the tailgate 12 may be movable between a raised configuration (shown in the drawings) in which the tailgate is latched to the body of the vehicle 10 to close the cargo bed 14, and a lowered configuration (not shown) in which the tailgate 12 has been unlatched and dropped approximately 90 degrees to provide better access to the truck bed for loading and unloading. Along with sidewalls 16a and 16b and front wall 17, the tailgate 12 may define or form a wall of the cargo bed.

For purposes described herein, the tonneau cover 20 may be considered to cover the cargo bed 14 when the cover 20 is mounted on the vehicle 10 and resides in any of the first, second, and third configurations described herein and shown in the drawings. The tonneau cover 20 also covers the cargo bed 14 in any transitional or intermediate configurations (i.e., configurations experienced when moving between any two of the tonneau cover configurations shown in the drawings).

FIGS. 1-6 show various views of one embodiment of a tonneau cover 20 structured to cover the cargo bed 14 of vehicle 10. In one or more arrangements, tonneau cover 20 includes a first cover portion 22 and a second cover portion 24 positioned opposite the first cover portion 22. A connecting structure (generally designated 23) (FIG. 3B) connects the first tonneau cover portion 22 with the second tonneau cover portion 24. A third tonneau cover portion 30 may be coupled to the connecting structure 23 so as to be movable with respect to the connecting structure 23. The third tonneau cover portion 30 may also be coupled to the connecting structure 23 so as to be securable in a first configuration (shown in FIG. 3A and described in greater detail below) and in a second configuration (shown in FIG. 3B and also described in greater detail below) when the tonneau cover is mounted on the vehicle 10 so as to cover the cargo bed 14. In the first configuration, the third tonneau cover portion 30 may be mountable on top surfaces 16a-1 and 16a-2 of sidewalls 16a and 16b.

In one or more arrangements, the connecting structure includes a first channel structure 26 which is coupled to (and extends between) the first cover portion 22 and the second cover portion 24. The connecting structure may also include a second channel structure 28 which is also is coupled to (and extends between) the first cover portion 22 and the second cover portion 24. The first and second channel structures 26 and 28 may rigidly connect the first and second tonneau cover portions 22 and 24. The third tonneau cover portion 30 may be coupled to the first channel structure 26 and the second channel structure 28 so as to be securable in the first configuration and in the second configuration when the tonneau cover is mounted on the vehicle 10 so as to cover the cargo bed 14.

First cover portion 22 may have a first side edge 22a and a second side edge 22b opposite the first side edge 22a. First cover portion 22 may also have a first end 22c and a second end 22d. The first cover portion 22 may be sized so that each of the first and second side edges 22a and 22b is mountable on a corresponding top surface 16a-1, 16b-1 of an associated one of sidewalls 16a, 16b, and so as to partially overlap the boundaries of an opening 14a (formed by the sidewalls 16a, 16b, front wall 17, and tailgate 12) which leads into the cargo bed 14. In addition, the first cover portion 22 may be sized so that the first cover portion second end 22d is mountable on a corresponding top surface of the front wall 17, so as to overlap the boundary of the opening 14a defined by the front wall 17. Thus, the first cover portion 22 may completely cover a portion of the opening 14a.

At least a portion of an underside of the first cover portion 22 may have a resilient gasket material (not shown) applied in a known manner thereto to bear against the top surfaces of the cargo bed walls, to provide a weather-resistive seal preventing entry of moisture and contaminants into the covered cargo bed 14.

For purposes of description, the first cover portion 22 may be the cover portion closest to the front of the vehicle 10 when the tonneau cover 20 is mounted on the vehicle. However, it is noted that, in one or more arrangements, the tonneau cover 20 is designed so that either of the cover portions 22 or 24 positioned at an end of the tonneau cover 20 may be positioned forwardly on the vehicle when the tonneau cover is mounted to the vehicle so as to cover the cargo bed 14.

A groove 22e may extend along a width of the first cover portion 22. Groove 22e may be structured to enable a protective sealing element 22f (such as a rubber gasket or elastic weather strip) to be received in the groove. The sealing element 22f may be compressed by a portion of the third cover portion 30 when the tonneau cover 20 is in the first configuration, thereby forming a seal to prevent moisture and dirt from entering the tonneau cover 20 along seams between the first and third cover portions 22 and 30.

Second cover portion 24 may have a first side edge 24a and a second side edge 24b opposite the first side edge 24a. Second cover portion 24 may also have a first end 24c and a second end 24d. The second cover portion 24 may be sized so that each of the first and second side edges 24a, 24b is mountable on a corresponding top surface 16a-1, 16b-1 of an associated one of sidewalls 16a, 16b, and so as to partially overlap the boundaries of the opening 14a defined by the sidewalls. In addition, the second cover portion 24 may be sized so that the second cover portion second end 24d is mountable on a corresponding top surface 12a of the tailgate 12, so as to overlap the boundary of the opening 14a defined by the tailgate 12. Thus, the second cover portion 24 may completely cover a portion of the opening 14a. At least a portion of an underside of the second cover portion 24 may have a resilient gasket material (not shown) applied in a known manner thereto to bear against the top surfaces of the walls and tailgate, to provide a weather-resistive seal preventing entry of contaminants into the covered cargo bed.

A groove 24e may extend along a width of the second cover portion 24. Groove 24e may be structured to enable a protective sealing element 24f (such as a rubber gasket or elastic weather strip) to be received in the groove. The sealing element 24f may be compressed by a portion of the third cover portion 30 when the tonneau cover 20 is in the first configuration, thereby forming a seal to prevent moisture and dirt from entering the tonneau cover 20 along seams between the second and third cover portions.

Tonneau cover 20 may have a total length LT (FIG. 3A) when the cover 20 is secured in the first configuration as shown in FIG. 1A. In addition, first cover portion 22 may have a length L1 (FIG. 1) and second cover portion may have a length L2 (FIG. 1). Lengths L1 and L2 may extend along axes parallel with the fore-aft axis FA1 (FIG. 1) of the vehicle 10 when the tonneau cover 20 is mounted on the vehicle 10 so as to cover the cargo bed 14.

Figure 4:
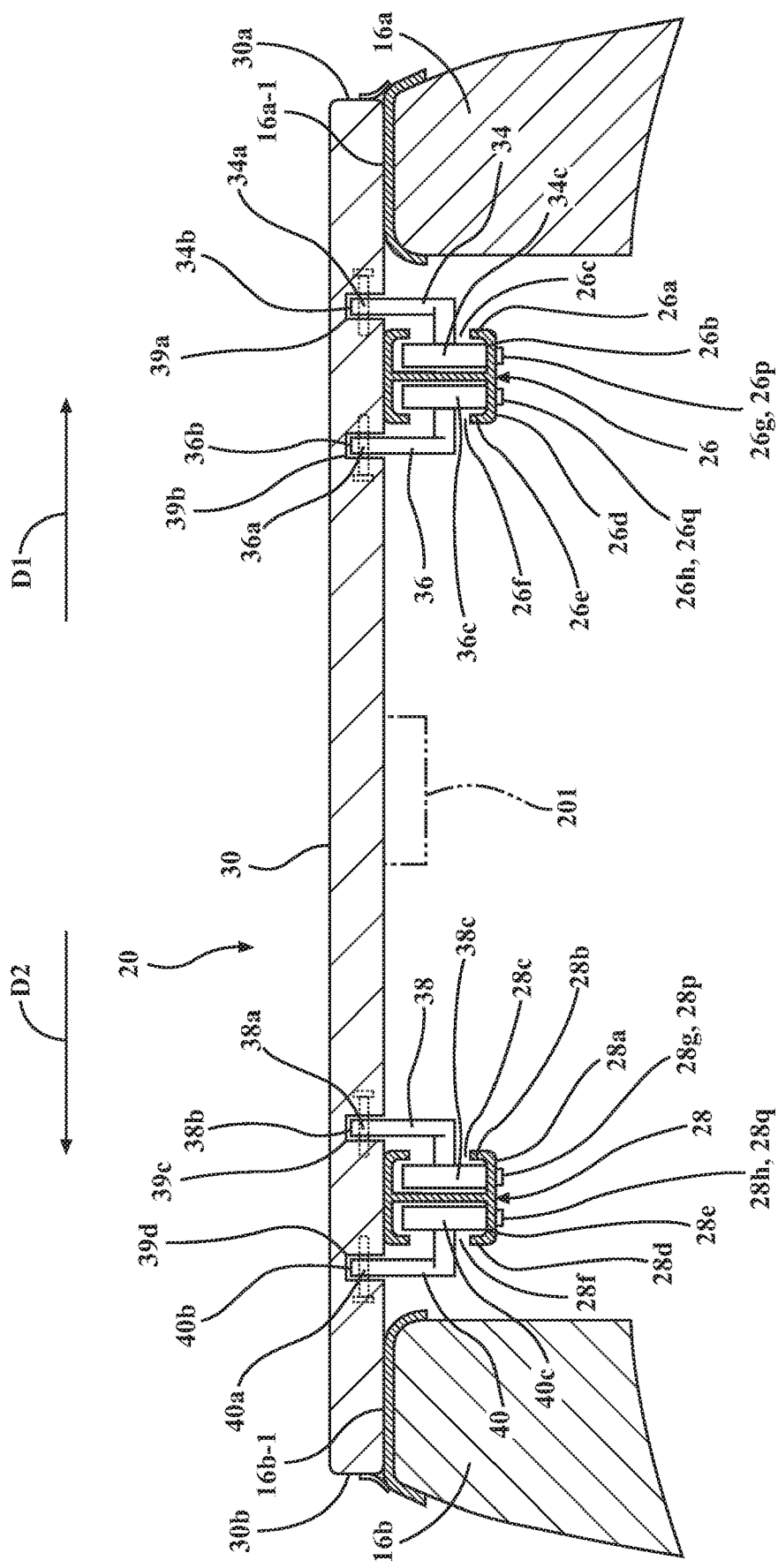
FIG. 4 is a partial cross-sectional view of a portion of the vehicle and tonneau cover embodiment shown in FIG. 1, facing toward a rear of the vehicle.
Figure 5A:
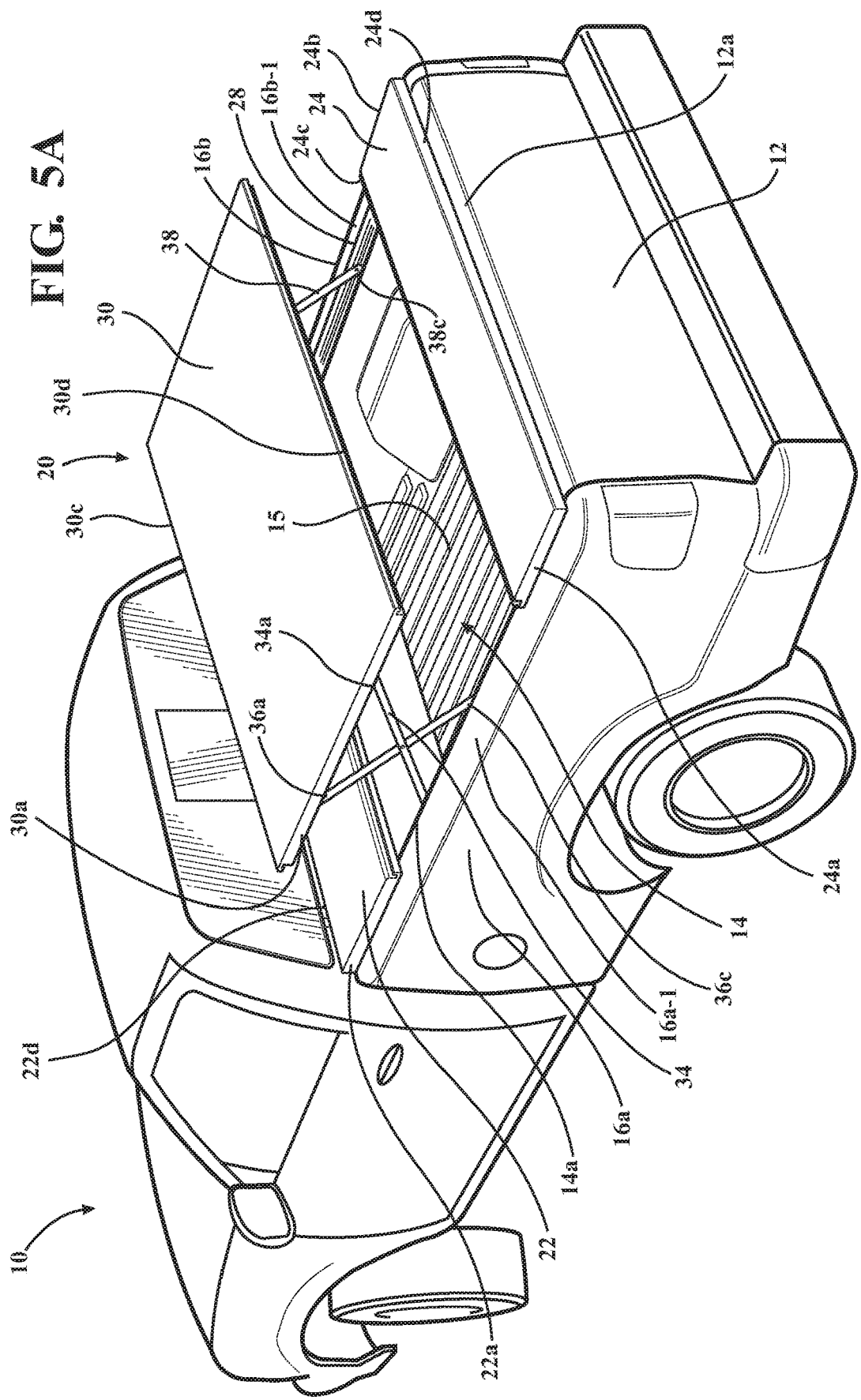
FIG. 5A is the perspective view of FIG. 1 showing the embodiment of the tonneau cover in the second configuration.
Figure 5B:
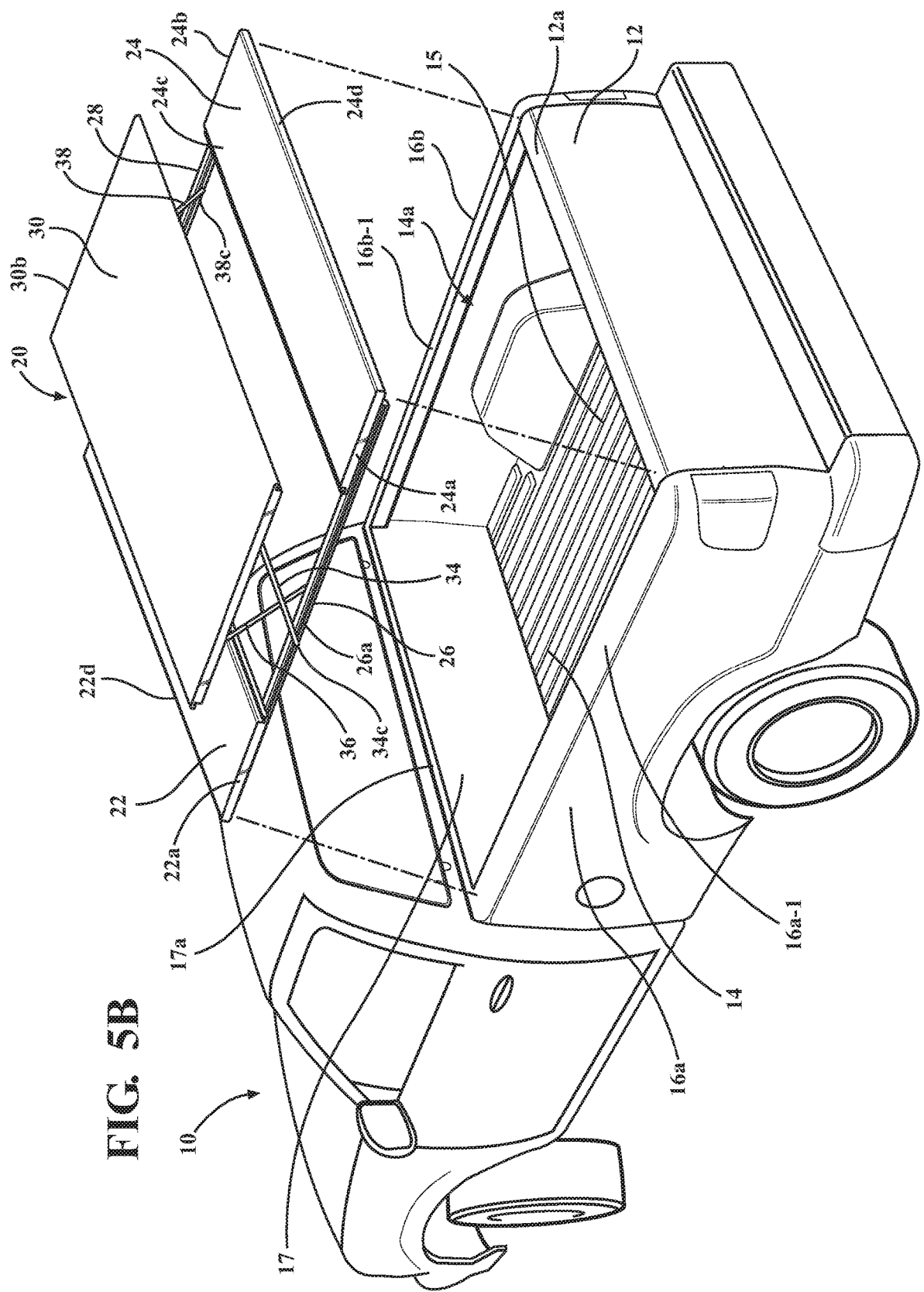
FIG. 5B is the perspective view of FIG. 5A showing the tonneau cover removed from the vehicle.

Referring to the drawings, and in particular to FIG. 4, in one or more arrangements, first channel structure 26 is a dual channel structure including a first channel portion 26a defining a longitudinal track 26b with an opening 26c structured to face in a first direction D1, toward a left side of the vehicle 10 when the tonneau cover 20 is mounted on the vehicle so as to cover the cargo bed 14. The first channel structure 26 may also include a second channel portion 26d defining a longitudinal track 26e with an opening 26f structured to face in a second direction D2 (i.e., toward a right side of the vehicle 10) opposite the first direction D1 when the tonneau cover 20 is mounted on the vehicle 10 so as to cover the cargo bed 14.

Figure 3A:
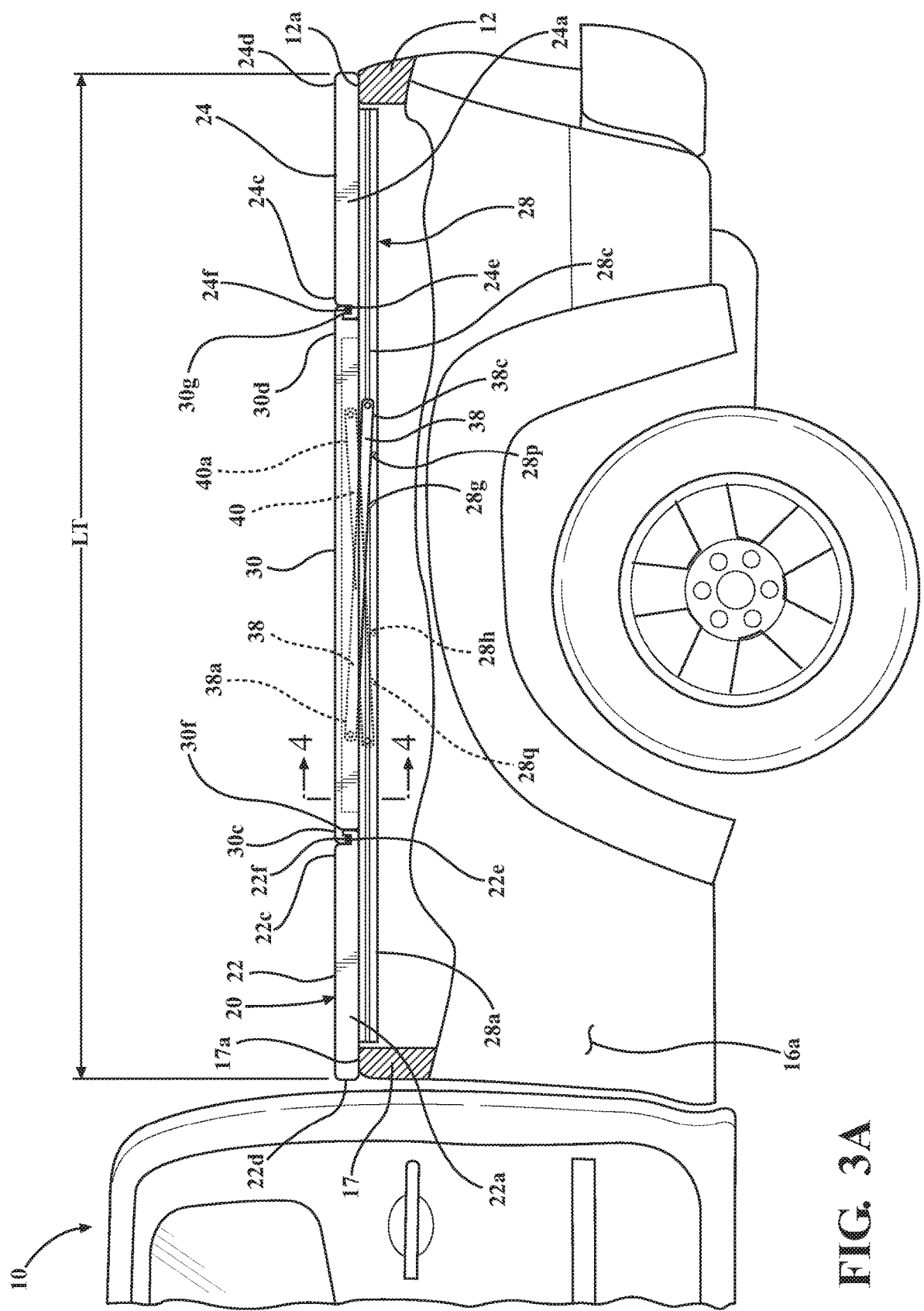
FIG. 3A is a partial cross-sectional side view of the vehicle and tonneau cover shown in FIG. 1, showing an embodiment of the tonneau cover in a first configuration.

In one or more arrangements, and as seen in FIG. 3A, the first channel structure 26 may include a first support leg first engagement feature 26g (such as a notch, groove, depression, or other feature) and a similar first support leg second engagement feature 26p formed along a length of the first channel structure first channel portion 26a, for engaging a portion of a first side first support leg 34 (described in greater detail below) to help maintain the third cover portion 30 in the second configuration. The first channel structure 26 may also include a second support leg engagement feature 26h (such as a notch, groove, depression, or other feature) formed along a length of the first channel structure second channel portion 26d, for engaging a portion of a first side second support leg 36 (described in greater detail below) to help maintain the third cover portion 30 in the second configuration.

In one or more arrangements, the second channel structure 28 may also be a dual channel structure including a first channel portion 28a defining a longitudinal track 28b with an opening 28c structured to face in the first direction D1 when the tonneau cover 20 is mounted on the vehicle so as to cover the cargo bed 14, and a second channel portion 28d defining a longitudinal track 28e with an opening 28f structured to face in the second direction D2 when the tonneau cover 20 is mounted on the vehicle 10 so as to cover the cargo bed 14. The second channel structure 28 may also include a first support leg first engagement feature 28g (such as a notch, groove, depression, or other feature) and a similar first support leg second engagement feature 28p formed along a length of the second channel structure first channel portion 28a, for engaging a portion of a second side first support leg 38 (described in greater detail below) to help maintain the third cover portion 30 in the second configuration. The second channel structure 28 may also include a second support leg first engagement feature 28h (such as a notch, groove, depression, or other feature) and a similar second support leg second engagement feature 28q formed along a length of the second channel structure second channel portion 28d, for engaging a portion of a second side second support leg 40 (described in greater detail below) to help maintain the third cover portion 30 in the second configuration.

In one or more arrangements, the third cover portion 30 may be secured at any of two or more different positions with respect to the first and second cover portions 22, 24, for the second configuration. For example, in the embodiment shown in FIG. 3B, the third cover portion 30 may be secured in either of a position AA spaced apart relatively farther from the first and second cover portions 22, 24, or a position BB spaced apart relatively nearer the first and second cover portions 22, 24. The position AA may be achieved using the engagement features 26g, 26h, 28g, 28h as previously described. The position BB may be achieved by using the second engagement features 26p, 26q, 28p, 28q previously described. Engagement features 28p and 28q may be spaced farther apart in a direction parallel to the vehicle fore-aft axis FA1 than the engagement features 28g and 28h so that, when engaged by respective ones of second side first support leg 38 and second side second support leg 40, the second side edge 30b of third cover portion 30 is maintained in the relatively lower position BB. Similarly, engagement features 26p and 26q may be spaced farther apart in a direction parallel to the vehicle fore-aft axis FA1 than the engagement features 26g and 26h so that, when engaged by respective ones of first side first support leg 34 and first side second support leg 36, the first side edge 30a of the third cover portion 30 is maintained in the relatively lower position BB. This arrangement enables the sizes of the first gap 51 between the third cover portion 30 and the first cover portion 22 and the second gap 53 between the third cover portion 30 and the second cover portion 24 (described below) to be varied according to the personal preferences of the user.

First and second channel structures 26 and 28 may be connected to first and second cover portions 22 and 24 along undersides of the cover portions, using bolts, welds, or any other suitable attachment mechanism. As seen best in FIGS. 2 and 4, first channel structure 26 may be attached to the first cover portion 22 such that the first channel structure 26 is spaced apart from the first cover portion first side edge 22a in a direction toward the vehicle fore-aft axis FA1, when the tonneau cover 20 is mounted on the vehicle 10 so as to cover the cargo bed 14. Also, second channel structure 28 may be attached to the first cover portion 22 such that the second channel structure 28 is spaced apart from the first cover portion second side edge 22b in a direction toward the vehicle fore-aft axis FA1, when the tonneau cover 20 is mounted on the vehicle 10 so as to cover the cargo bed 14.

In addition, first channel structure 26 may be attached to the second cover portion 24 such that the first channel structure 26 is spaced apart from the second cover portion first side edge 24a in a direction toward the vehicle fore-aft axis FA1, when the tonneau cover 20 is mounted on the vehicle 10 so as to cover the cargo bed 14. Also, second channel structure 28 may be attached to the second cover portion 24 such that the second channel structure 28 is spaced apart from the second cover portion second side edge 24b in a direction toward the vehicle fore-aft axis FA1, when the tonneau cover 20 is mounted on the vehicle 10 so as to cover the cargo bed 14.

As seen in FIG. 4, the attachment locations of the first and second channel structures 26, 28 with respect to the side edges 22a, 22b of the first cover portion 22 and the side edges 24a, 24b of the second cover portion 24 may be specified so as to control the distances of the first and second channel structures 26, 28 from the sidewalls 16a, 16b of the cargo bed 14 when the tonneau cover 20 is mounted on the vehicle 10 so as to cover the cargo bed 14. This arrangement may aid in centering or locating the tonneau cover 20 on the vehicle 10 so as to cover the cargo bed 14, prior to securement of the tonneau cover 20 on the vehicle.

Third cover portion 30 may have a first side edge 30a and a second side edge 30b opposite the first side edge 30a. Third cover portion 30 may also have a first end 30c and a second end 30d opposite the first end 30c. The third cover portion 30 may be sized so that each of the first and second side edges 30a, 30b is mountable on a corresponding top surface 16a-1, 16b-1 of an associated one of sidewalls 16a, 16b, and so as to partially overlap the boundaries of the opening 14a defined by the sidewalls. Thus, the third cover portion 30 may completely cover a portion of the opening 14a. At least a portion of an underside of the third cover portion 30 may have a resilient gasket material (not shown) applied in a known manner thereto to bear against the top surfaces of the sidewalls 16a, 16b, to provide a weather-resistive seal preventing entry of contaminants into the covered cargo bed.

Figure 3B:
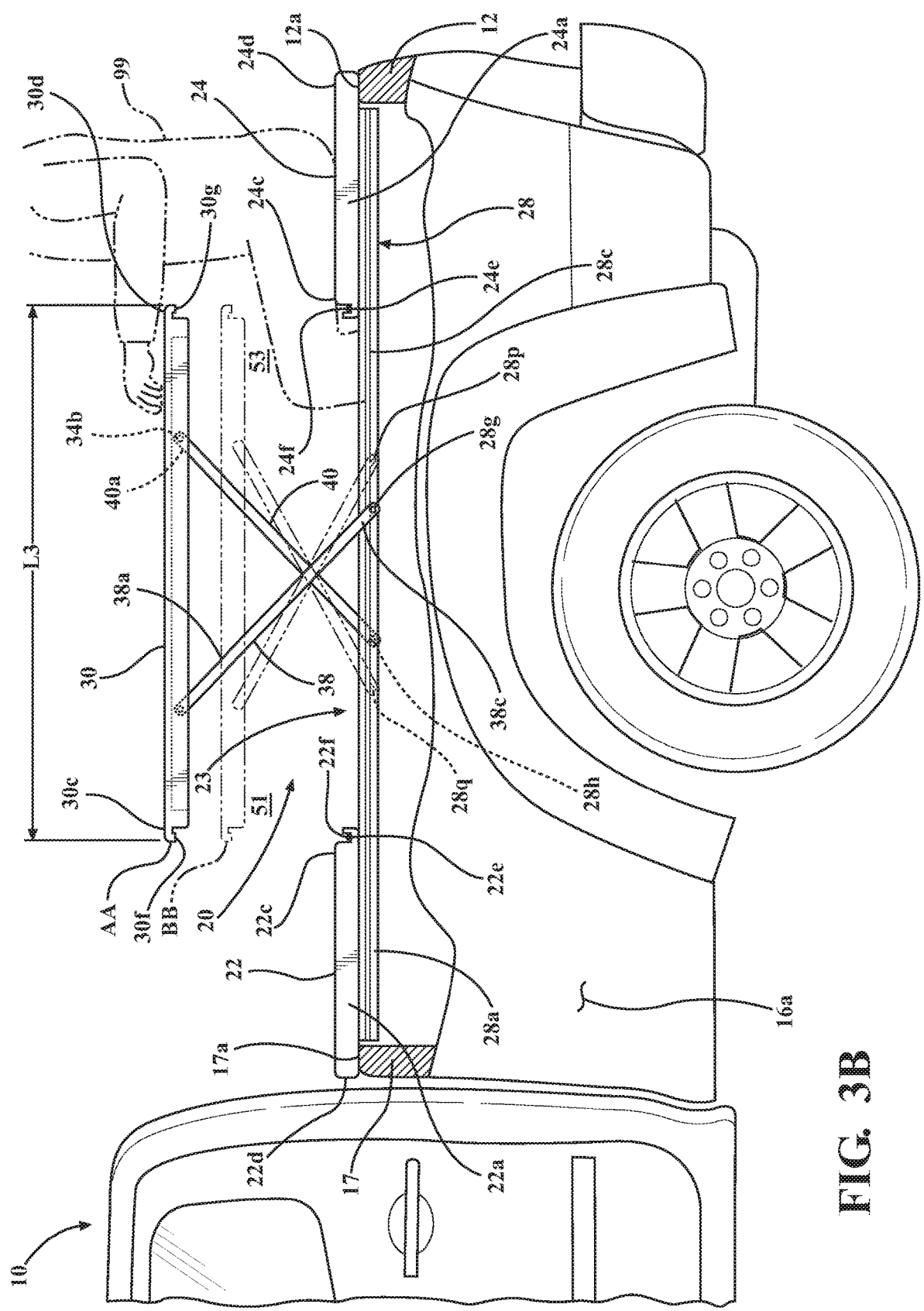
FIG. 3B is the partial cross-sectional side view of FIG. 3A showing the embodiment of the tonneau cover in a second configuration.

In addition, third cover portion 30 may have a length L3 (FIG. 3B). Length L3 may extend along an axis parallel with the fore-aft axis FA1 of the vehicle 10 when the tonneau cover 20 is mounted on the vehicle 10 so as to cover the cargo bed 14. In one or more arrangements, a ratio of the lengths L1, L2, L3 of the first, second, and third tonneau cover portions to each other may be about ¼ LT (first cover portion), ¼ LT (second cover portion), and ½ LT (third cover portion) or, stated another way, L1=L2=½ L3.

As seen in FIGS. 3A and 3B, a portion of the first end 30c of the third cover portion 30 may be structured to overlap and reside opposite end portion 22c of the first cover portion 22 when the tonneau cover 20 is in the first configuration. In addition, a first groove 30f may extend along a width of the overlapping portion of the third cover portion first end 30c. The third cover portion first groove 30f may be positioned so as to overlie and receive therein a portion of the first cover portion 22 forming first cover portion groove 22e when the tonneau cover 20 is in the first configuration. In this arrangement, the overlapping portion of the first end 30c of the third cover portion 30 may compress weather strip 22f positioned in the groove 22e formed in the first cover portion 22, thereby providing a seal to prevent entry of moisture, dirt, and other elements when the tonneau cover 20 is in the first configuration.

Also, second end 30d of the third cover portion 30 may be structured to overlap and reside opposite end portion 24c of the second cover portion 24 when the tonneau cover 20 is in the first configuration. In addition, a second groove 30g may extend along a width of the overlapping end 30d of the third cover portion 30. The third cover portion second groove 30g may be positioned so as to overlie and receive therein a portion of the second cover portion 24 forming second cover portion groove 24e when the tonneau cover 20 is in the first configuration. In this arrangement, the overlapping second end 30d of the third cover portion 30 may compress the resilient weather strip 24f positioned in the groove 24e formed in the second cover portion 24, thereby providing a seal to prevent entry of moisture, dirt, and other elements when the tonneau cover 20 is in the first configuration. In one or more alternative arrangements, the grooves 30f and 30g formed in the third cover portion 30 may be omitted to provide a flat overlapping surface structured to compress the weather seals in the first and second tonneau cover portion grooves 22e and 24e when the tonneau cover 20 is in the first configuration.

Referring to the drawings, the tonneau cover 20 may also include a first side first support leg 34 having a first portion 34a rotatably connected to the third cover portion 30 at a first location 34b, and a second portion 34c coupled to the first channel structure first channel portion 26a so as to be movable and rotatable with respect to the first channel structure first channel portion 26a. In particular arrangements, the support leg second portion 34c is movably and rotatably received in the first channel structure first channel portion 26a. For example, the support leg second portion 34c may be structured to be slidable, rollable, or otherwise movable within the first channel portion 26a. A cavity 39a including first location 34b may be formed in an underside of the third cover portion 30, to accommodate movement of a portion of the first side first support leg 34.

In addition, a first side second support leg 36 may be provided, having a first portion 36a rotatably connected to the third cover portion 30 at a second location 36b spaced apart from the first location 34b, and a second portion 36c coupled to the first channel structure second channel portion 26d so as to be movable and rotatable with respect to the first channel structure second channel portion 26d. In particular arrangements, the support leg second portion 36c is movably and rotatably received in the first channel structure second channel portion 26d. For example, the support leg second portion 36c may be structured to be slidable, rollable, or otherwise movable within the second channel portion 26d. A cavity 39b including second location 36b may be formed in an underside of the third cover portion, to accommodate movement of a portion of the first side second support leg 36.

The positions of the second portions 34c, 36c of the first side first support leg 34 and first side second support leg 36 may be adjustable along their respective channel portions 28a and 28d as described herein, to support first side edge 30a of the third cover portion 30 in an elevated position when the tonneau cover 20 is in the second configuration.

The tonneau cover 20 may also include a second side first support leg 38 having a first portion 38a rotatably connected to the third cover portion 30 at a first location 38b, and a second portion 38c coupled to the second channel structure first channel portion 28a so as to be movable and rotatable with respect to the second channel structure first channel portion 28a. In particular arrangements, the support leg second portion 38c is movably and rotatably received in the second channel structure first channel portion 28a. For example, the support leg second portion 38c may be structured to be slidable, rollable, or otherwise movable within the first channel portion 28a. A cavity 39c including first location 38b may be formed in an underside of the third cover portion, to accommodate movement of a portion of the second side first support leg 38.

In addition, a second side second support leg 40 may be provided, having a first portion 40a rotatably connected to the third cover portion 30 at a second location 40b spaced apart from the first location 38b, and a second portion 40c coupled to the second channel structure second channel portion 28d so as to be movable and rotatable with respect to the second channel structure second channel portion 28d. In particular arrangements, the support leg second portion 40c is movably and rotatably received in the second channel structure second channel portion 28d. For example, the support leg second portion 40c may be structured to be slidable, rollable, or otherwise movable within the second channel portion 28d. A cavity 39d including second location 40b may be formed in an underside of the third cover portion, to accommodate movement of a portion of the second side second support leg 40.

The positions of the second portions 38c, 40c of the second side first support leg 38 and second side second support leg 40 may be adjustable along their respective channel portions 28a and 28d as described herein, to support second side edge 30b of the third cover portion 30 in an elevated position when the tonneau cover 20 is in the second configuration.

In one or more arrangements, the portions of the support legs 34, 36, 38, 40 rotatably and/or movably connected to the third cover portion 30 and the channel structures 26, 28 may be ends of the supports legs. However, in alternative embodiments, portions of the support legs 34, 36, 38, 40 located intermediate the ends of the legs may be rotatably and/or movably connected to the third cover portion 30 and the channel structures 26, 28.

In one or more arrangements, third cover portion 30 may be coupled to the first channel structure 26 and the second channel structure 28 so as to be securable in a first configuration (shown in FIG. 3A and described in greater detail below) and in a second configuration (shown in FIG. 3B and also described in greater detail below) when the tonneau cover 20 is mounted on the vehicle 10 so as to cover the cargo bed 14.

Referring to FIG. 3A, in the first configuration of the tonneau cover 20, the third cover portion 30 resides (and is secured) between the first cover portion 22 and the second cover portion 24 and is mountable on top surfaces 16a-1, 16b-1 of the sidewalls 16a, 16b of the cargo bed 14 when the tonneau cover 20 is positioned on the vehicle 10 so as to cover the cargo bed. In one or more arrangements, the first cover portion 22, second cover portion 24, and third cover portion 30 are structured and connected so that uppermost surfaces of the first, second, and third cover portions are substantially coplanar when the third cover portion 30 is in the first configuration and the tonneau cover 20 is mounted on the vehicle 10 so as to cover the cargo bed 14. As used herein, the term "substantially" includes exactly the term it modifies and slight variations therefrom. Thus, the term "substantially coplanar" means exactly coplanar and slight variations therefrom. In the first configuration of the tonneau cover 20, variations in coplanarity can include mismatches within normal manufacturing and assembly tolerances, for example. Thus, the first and second channel structures 26 and 28 may be connected to first and second cover portions 22, 24 and the third cover portion 30 may be secured in a retracted or lowered position between the first cover portion 22 and the second cover portion 24 in the first configuration as shown in FIG. 3A. In this manner, the connected components may form a unitary, rigid tonneau cover structure which may be easily positioned on the vehicle to cover the cargo bed 14, and which may be easily removed by user(s).

Figure 7:
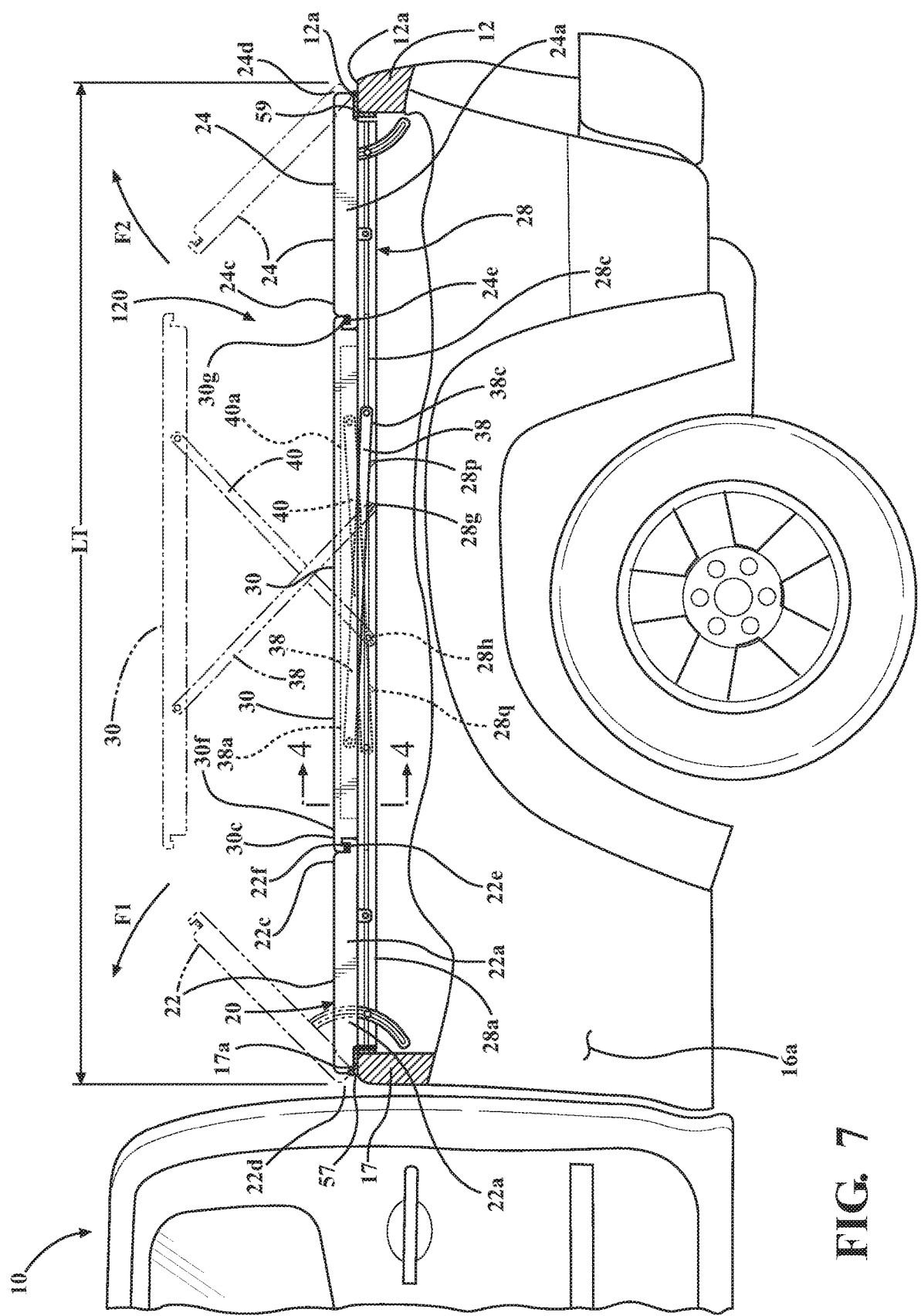
FIG. 7 is a partial cross-sectional side view similar to the views of FIGS. 3A, and 3B, showing a tonneau cover in accordance with another embodiment described herein.
Figure 8:
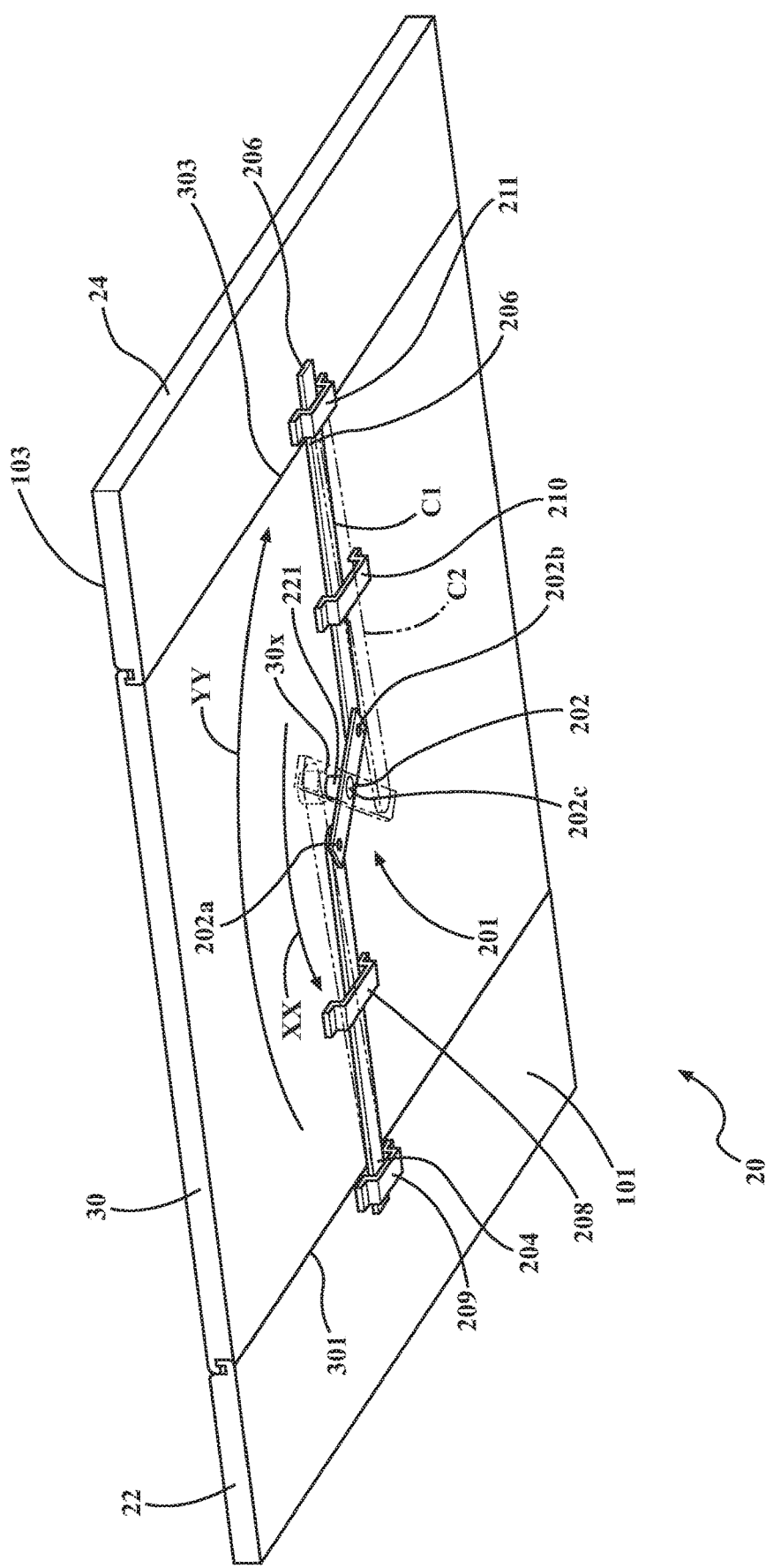
FIG. 8 is a perspective view showing a structure and operation of a tonneau cover locking mechanism in accordance with an embodiment described herein.

Referring to FIG. 8, to maintain the first, second, and third cover portions 22, 24, and 30 in a coplanar arrangement as shown in FIGS. 3B and 7, a locking mechanism 201 may be employed. The locking mechanism 201 may be mounted to what would be an underside 101 of the tonneau cover 20 when the cover is mounted on the vehicle 10 as designed so as to cover the cargo bed 14. In one or more arrangements, locking mechanism 201 may include a hub 202 rotatably connected to tonneau third cover portion 30. The hub may include an annular shaft 221 with a center hole containing a keyway (not shown). A through hole 30x may be provided in third cover portion 30 to receive the shaft 221 of the hub 202 therein, and to permit user access to the keyway from a side 103 of the tonneau cover opposite side 101. A first brace 204 may be rotatably connected to a first end 202a of the hub 202, and a second brace 206 may be rotatably connected to a second end 202b of the hub 202 opposite and spaced apart from the first end 202a. Both ends 202a and 202b of the hub (and also the locations of the rotational connections between the hub and the first and second braces 204 and 206) may also be spaced apart from the rotational center 202c of the hub 202.

One or more first brace guides 208, 209 may be attached to potions of the tonneau cover 20 to guide motion of the first brace 204 between a first, extended position of the first brace (in a locked condition C1 of the locking mechanism, shown in solid lines in FIG. 8) and a second, retracted condition of the brace (in an unlocked condition C2 of the locking mechanism, as shown in phantom lines in FIG. 8). At least one brace guide 209 may be mounted on first cover portion 22 to guide motion of the first brace 204 with respect to the first cover portion 22. Another brace guide 208 may be mounted on third cover portion 30 to guide motion of the first brace 204 with respect to the third cover portion 30.

As seen in FIG. 8, the locking mechanism 201 may be structured so that first brace 204 extends across the seam 301 between the first cover portion 22 and the third cover portion 30 when the locking mechanism 201 is in the locked condition C1, thereby preventing movement of third cover portion 30 with respect to first cover portion 22 and toward the second configuration of the tonneau cover 20 as shown in FIG. 3B. Also, locking mechanism 201 may be structured so that first brace 204 is retractable across the seam 301 for the unlocked condition C2 of the locking mechanism, so that the entire first brace 204 rests along third cover portion 30. In this retracted position, the first brace 204 will not prevent motion of the third cover portion 30 with respect to the first cover portion 22.

In addition, one or more second brace guides 210, 211 may be attached to potions of the tonneau cover to guide motion of the second brace 206 between a first, extended position of the second brace (in the locked condition C1 of the locking mechanism, shown in solid lines in FIG. 8) and a second, retracted condition of the brace (in an unlocked condition C2 of the locking mechanism, as shown in phantom lines in FIG. 8). At least one brace guide 211 may be mounted on second cover portion 24 to guide motion of the second brace 206 with respect to the second cover portion 24. Another brace guide 210 may be mounted on third cover portion 30 to guide motion of the second brace 206 with respect to the third cover portion 30.

Also, as seen in FIG. 8, the locking mechanism 201 may be structured so that second brace 206 extends across the seam 303 between the second cover portion 24 and the third cover portion 30 when the locking mechanism 201 is in the locked condition C1, thereby preventing movement of third cover portion 30 with respect to second cover portion 24 and toward the second configuration of the tonneau cover 20 as shown in FIG. 3B. Also, locking mechanism 201 may be structured so that second brace 206 is retractable across the seam 303 for the unlocked condition of the locking mechanism, so that the entire second brace 206 rests along third cover portion 30. In this retracted position, the second brace 206 will not prevent motion of the third cover portion 30 with respect to the second cover portion 24.

The locking mechanism 201 may be structured so that a close sliding fit exists between the first and second braces 204, 206 and the first, second, and third cover portions 22, 24, 30 along the underside of the tonneau cover 20. Thus, the first and second braces 204, 206 may slide along surfaces of the first, second, and third cover portions 22, 24, 30 during operation of the locking mechanism 201 as described below.

As seen in FIG. 8, first and second braces 204, 206 are in their extended conditions when the locking mechanism 201 is operated to secure the cover portions 22, 24, and 30 in a flat, coplanar condition. The locking mechanism 201 may be reconfigured between the locked condition C1 (in which the locking mechanism is shown in solid lines) and the unlocked condition C2 (in which the locking mechanism is shown in phantom lines), by inserting a key or other suitable implement into the hub shaft from side 103 of the tonneau cover 20, and rotating the hub in one of the directions XX and YY shown in FIG. 8.

To reconfigure the locking mechanism 201 from the locked condition C1 to the unlocked condition C2, a user may rotate the hub 202 in direction YY. This rotation produces retraction of the first brace 204 through second brace guide 209 and across the seam 301 between first cover portion 22 and third cover portion 30. This rotation also produces retraction of the second brace 206 through second brace guide 211 and across the seam 303 between second cover portion 24 and third cover portion 30. This releases the third cover portion 30 for movement relative to the first cover portion 22 and second cover portion 24, so that the tonneau cover 20 may be configured to the second configuration shown in FIG. 3B.

To reconfigure the locking mechanism 201 from the unlocked condition C2 to the locked condition C1, a user may move the third cover portion 30 into coplanar alignment with the first and second cover portions 22, 24, as shown in FIG. 3A. The user may then rotate the hub 202 in direction XX. This rotation produces extension of the first brace 204 across the seam 301 between first cover portion 22 and third cover portion 30 and through second brace guide 209. This rotation also produces extension of the second brace 206 across the seam 303 between second cover portion 24 and third cover portion 30 and through second brace guide 211. This secures the third cover portion 30 with respect to the first and second cover portions in the arrangement shown in FIG. 3A. This arrangement permits a user to remove and transport the tonneau cover 20 from the vehicle 10 while the portions of the cover are secured in a coplanar arrangement, making the tonneau cover easier to handle and move.

Although a particular embodiment of a locking mechanism is described herein, any of a variety of different types and designs of locking mechanisms may be used if suitable for the purposes described herein.

Referring to FIGS. 3A and 3B, when the tonneau cover 20 is in the first configuration shown in FIG. 3A, the third cover portion 30 may be unlocked from the first and second cover portion and raised vertically by a user. In one or more arrangements, the third cover portion may be raised by users positioned along each side of the vehicle 10. Upward movement of the third cover portion 30 by users may cause first side first support leg second portion 34c to slide along first channel structure first channel portion track 26b, while first side second support leg second portion 36c slides along first channel structure second channel portion track 26e. The first side first support leg second portion 34c and first side second support leg second portion 36c may slide in opposite directions along their respective tracks until the first side first support leg second portion 34c reaches the support leg engagement feature 26g formed in first channel portion 26a and the first side second support leg second portion 36c reaches the support leg engagement feature 26h formed in second channel portion 26d. The first side first support leg second portion 34c then enters or otherwise engages the support leg engagement feature 26g, and the first side second support leg second portion 36c enters or otherwise engages the support leg engagement feature 26h. When the support leg second portions 36c and 34c are engaged with their respective support leg engagement features 26g and 26h, the support leg portions 36c and 34c are prevented from moving along their respective channel portions until the support leg second portions 36c and 34c are removed or disengaged from the support leg engagement features. By this arrangement, the third cover portion first side edge 30a may be maintained in a raised condition.

Similarly, upward movement of the third cover portion 30 by users may also cause second side first support leg second portion 38c to slide along second channel structure first channel portion track 28b, while second side second support leg second portion 40c slides along second channel structure second channel portion track 28e. The second side first support leg second portion 38c and second side second support leg second portion 40c may slide in opposite directions along their respective tracks until the second side first support leg second portion 38c reaches the support leg engagement feature 28g formed in first channel portion 28a and the second side second support leg second portion 40c reaches the support leg engagement feature 28h formed in second channel portion 28d. The second side first support leg second portion 38c then enters or otherwise engages the support leg engagement feature 28g, and the second side second support leg second portion 40c enters or otherwise engages the support leg engagement feature 28h. When the support leg second portions 38c and 40c are engaged with their respective support leg engagement features 28g and 28h, the support leg second portions 38c and 40c are prevented from moving along their respective channel portions until the support leg second portions 38c and 40c are removed or disengaged from the support leg engagement features. By this arrangement, the third cover portion second side edge 30b may be maintained in a raised condition.

As seen in FIG. 3B, when the tonneau cover is in the second configuration, the third cover portion 30 is spaced apart from the first cover portion 22 and the second cover portion 24 to form a first gap 51 between the third cover portion 30 and the first cover portion 22 and a second gap 53 between the third cover portion 30 and the second cover portion 24. Also, when the tonneau cover 20 is in the second configuration, the third cover portion 30 is spaced apart from the top surfaces 16a-1, 16b-1 of the sidewalls 16a, 16b of the cargo bed 14. As shown in FIG. 3A, when the tonneau cover 20 is in the second configuration, the raised third cover portion 30 may be usable as a table by one or more users seated on the first and/or second cover portions 22 and 24. The first and/or second cover portions 22 and 24 may be used as benches by one or users using the third cover portion 30 as a table. FIG. 3B shows a user 99 seated on second cover portion 24, which is being used as a bench for the table surface/third cover portion 30.

In one or more arrangements, the first gap 51 may be sized to enable one or more legs of a user seated on the first cover portion 22 to extend therethrough. In addition, the second gap 53 may be sized to enable one or more legs of a user seated on the second cover portion 24 to extend therethrough. To lower the third cover portion 30 to the first configuration, the third cover portion 30 may be lifted above its level in the second configuration to disengage the support leg second portions 34c, 36c, 38c, 40c are disengaged from their respective support leg engagement features. Users may then lower the third cover portion, causing the support leg second portions 34c, 36c, 38c, 40c to slide in opposite directions along their respective tracks until the third cover portion 30 and the support legs are returned to their positioned in the first configuration of the tonneau cover (shown in FIG. 3A).

FIG. 7 is a schematic side view of another embodiment 120 of the tonneau cover. The tonneau cover embodiment shown in FIG. 7 may be arranged and secured in a third configuration as shown (in phantom). Tonneau cover 120 may include all of the elements previously described and may be operable to for positioning and securement in a first configuration and a second configuration as previously described. In addition, tonneau cover 120 may include one or more mounting brackets or flanges 57, 59 connected to the connecting structure 23. In the embodiment shown, mounting flanges 57, 59 may be attached to ends of the first channel structure 26 and the second channel structure 28, using welds, fasteners, and/or any other suitable method. A first mounting flange 57 may be structured to be mountable on a top surface of a wall of the cargo bed (such as front wall 17 or the cargo bed rear wall formed by tailgate 12) when the tonneau cover 120 is positioned on the vehicle 10 so as to cover the cargo bed 14. A second mounting flange 59 may be structured to be mountable on a top surface of a wall of the cargo bed (such as front wall 17 or the cargo bed rear wall formed by tailgate 12) when the tonneau cover 120 is positioned on the vehicle 10 so as to cover the cargo bed 14. Thus, instead of first cover portion 22 and second cover portion 24 resting directly on the front wall 17 and tailgate 12 when the tonneau cover 120 is positioned on the vehicle 10 to cover the cargo bed 14, the mounting flanges 57 and 59 rest on the top surfaces of the front wall 17 and tailgate 12 and act to support the channel structures 26, 28 and other portions of the tonneau cover 120.

In addition, the first cover portion 22 may be rotatably coupled to the first mounting flange 57 and the second cover portion 24 may be positioned opposite the first tonneau cover portion 22 and rotatably coupled to the second mounting flange 59, using hinges or other suitable mechanisms. Also, third tonneau cover portion 30 may be coupled to the connecting structure 23 in a manner previously described, so as to be movable in directions toward and away from the connecting structure 23. This arrangement enables the first cover portion 22 and the second cover portion 24 to be rotated when the tonneau cover 120 is mounted on the vehicle 10, thereby providing access to the cargo bed without the need to remove the tonneau cover. In addition, when one or more of the first cover portion 22 and the second cover portion 24 are rotated upwardly, the third cover portion 30 may be raised as previously described to provide the third configuration shown in FIG. 7. This third configuration (shown in FIG. 7 in phantom) provides access to the center of the cargo bed 14 and also to one or more ends of the cargo bed.

In one or more arrangements, the first cover portion 22 may be rotatably coupled to the first mounting flange 57 so as to be rotatable in a first direction F1 toward a front of the vehicle 10 when the tonneau cover 120 is mounted on the vehicle so as to cover the cargo bed 14, and the second cover portion 24 may be rotatably coupled to the second mounting flange 59 so as to be rotatable in a second direction F2 opposite the first direction F1 when the tonneau cover 120 is mounted on the vehicle 10 so as to cover the cargo bed 14. In the arrangement shown in FIG. 7, the first, second, and third tonneau cover portions 22, 24, 30 are also coupled to the connecting structure 23 so as to be positionable and securable with respect to each other to, in combination, form a planar surface mountable to walls of the cargo bed. The mountable planar surface may be formed by the undersides of the first, second, and third tonneau cover portions 22, 24, 30 positioned and secured adjacent each other (as illustrated by the tonneau cover shown in solid lines lying flat on the tops of the cargo bed walls in FIG. 7).

Figure 6:
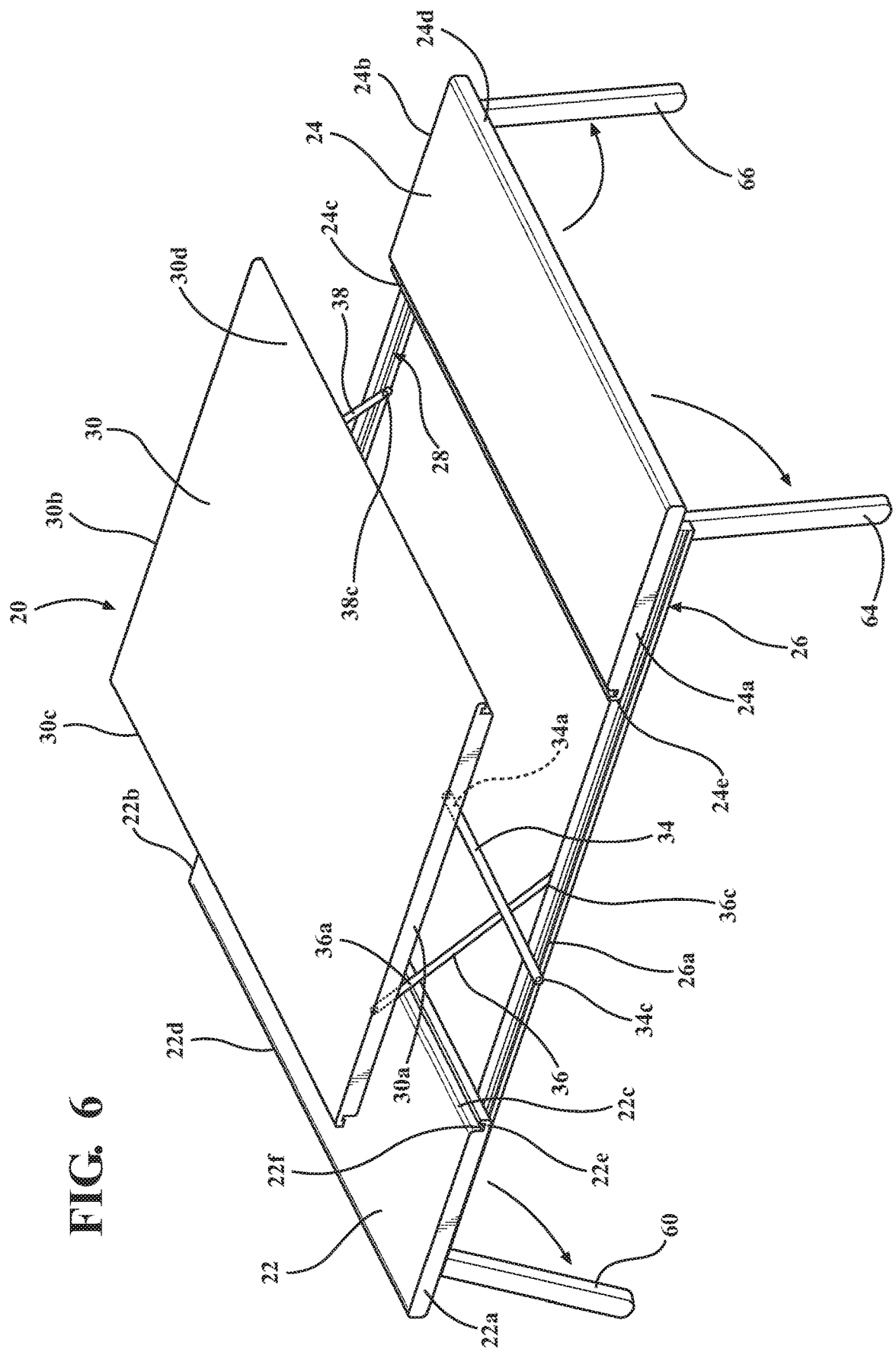
FIG. 6 is a perspective view of an embodiment of the tonneau cover detached from the vehicle and supportable on a ground surface.

Referring to FIG. 6, in one or more of the arrangements described herein, an embodiment of the tonneau cover described herein may also incorporate one or more retractable ground legs 60 and 62 (opposite leg 60, and not visible in FIG. 6) mounted to an underside of first cover portion 22 so as to be foldable or rotatable with respect to the first cover portion 22. The ground legs 60 and 62 may be securable in a retracted configuration along the underside of the first cover portion 22, and also in an extended or support configuration (shown in FIG. 6). An embodiment of the tonneau cover described herein may also incorporate one or more retractable ground legs 64 and 68 mounted to an underside of second cover portion 24 so as to be foldable or rotatable with respect to the second cover portion 24. The ground legs 64 and 68 may be securable in a retracted configuration along the underside of the second cover portion 24, and also in an extended or support configuration (shown in FIG. 6) to support the tonneau cover 20 on a ground surface. These features enable the tonneau cover to be removed from the vehicle and used on a ground surface (for example, adjacent the vehicle 10) as a table with integral seating.

The embodiments of the tonneau cover described herein may be secured to the vehicle 10 using any of a variety of known, suitable mechanisms, for example various types of clamps.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

In the detailed description, reference is made to the accompanying figures, which form a part hereof. In the figures, similar symbols and reference characters typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. Accordingly, reference should be made to the following claims, rather than to the foregoing specification, as indicating the scope of the invention.

What is claimed is:

1. A tonneau cover structured to cover a cargo bed of a vehicle, the tonneau cover comprising:
   a first tonneau cover portion;
   a second tonneau cover portion positioned opposite the first tonneau cover portion;
   a connecting structure connecting the first tonneau cover portion with the second tonneau cover portion; and
   a third tonneau cover portion coupled to the connecting structure so as to be securable in a first position to form a first configuration of the tonneau cover and in a second position to form a second configuration of the tonneau cover, when the tonneau cover is mounted on the vehicle so as to cover the cargo bed,
   wherein, in the first configuration, the third tonneau cover portion resides between the first and second tonneau cover portions, and wherein, in the second configuration, the third tonneau cover portion is spaced apart from the first tonneau cover portion and the second tonneau cover portion so as to form a first gap between the third tonneau cover portion and the first cover portion and a second gap between the third tonneau cover portion and the second tonneau cover portion.

2. The tonneau cover of claim 1 wherein the connecting structure comprises a first channel structure coupled to and extending between the first tonneau cover portion and the second tonneau cover portion, and a second channel structure coupled to and extending between the first tonneau cover portion and the second tonneau cover portion, and wherein the third tonneau cover portion is coupled to the first channel structure and the second channel structure so as to be movable with respect to the first channel structure and the second channel structure.

3. The tonneau cover of claim 2 further comprising:
   a first mounting flange structured to be mountable on a top surface of a wall of the cargo bed when the tonneau cover is positioned on the vehicle so as to cover the cargo bed; and
   a second mounting flange structured to be mountable on a top surface of a wall of the cargo bed when the tonneau cover is positioned on the vehicle so as to cover the cargo bed,
   wherein the first tonneau cover portion is rotatably coupled to the first mounting flange, the second tonneau cover portion is rotatably coupled to the second mounting flange, the first channel structure is connected to the first mounting flange and the second mounting flange, and the second channel structure is connected to the first mounting flange and to the second mounting flange.

4. The tonneau cover of claim 3 wherein the first tonneau cover portion is rotatably coupled to the first mounting flange so as to be rotatable in a first direction toward a front of the vehicle when the tonneau cover is mounted on the vehicle so as to cover the cargo bed.

5. The tonneau cover of claim 4 wherein the second tonneau cover portion is rotatably coupled to the second mounting flange so as to be rotatable in a second direction opposite the first direction when the tonneau cover is mounted on the vehicle so as to cover the cargo bed.

6. The tonneau cover of claim 5 wherein the tonneau cover is structured to be securable in a third configuration in which the first tonneau cover portion has been rotated in the first direction from its position in one of the first configuration and the second configuration, the second tonneau cover portion has been rotated in the second direction from its position in one of the first configuration and the second configuration, and the third tonneau cover portion is a position in which it resides when the tonneau cover is in the second configuration.

7. The tonneau cover of claim 2 wherein the first channel structure is a dual channel structure including a first channel portion with an opening structured to face in a first direction away from a fore-aft axis of the vehicle when the tonneau cover is mounted on the vehicle so as to cover the cargo bed, and a second channel portion with an opening structured to face in a direction toward the vehicle fore-aft axis when the tonneau cover is mounted on the vehicle so as to cover the cargo bed.

8. The tonneau cover of claim 2 wherein the first tonneau cover portion has a first side edge and a second side edge opposite the first edge, wherein the first channel structure is spaced apart from the first tonneau cover portion first side edge, and wherein the second channel structure is spaced apart from the first tonneau cover portion second side edge.

9. The tonneau cover of claim 8 wherein the second tonneau cover portion has a first side edge and a second side edge opposite the first side edge, wherein the first channel structure is spaced apart from the second tonneau cover portion first side edge, and the second channel structure is spaced apart from the second tonneau cover portion second side edge.

10. The tonneau cover of claim 2 further comprising:
    a first side first support leg having a first portion rotatably connected to the third tonneau cover portion at a first location, and a second portion movably and rotatably coupled to a first channel portion of the first channel structure; and
    a first side second support leg having a first portion rotatably connected to the third tonneau cover portion at a second location spaced apart from the first location, and a second portion movably and rotatably coupled to a second channel portion of the first channel structure.

11. The tonneau cover of claim 10 further comprising:
    a second side first support leg having a first portion rotatably connected to the third tonneau cover portion at a third location, and a second portion movably and rotatably coupled to a first channel portion of the second channel structure; and
    a second side second support leg having a first portion rotatably connected to the third tonneau cover portion at a fourth location spaced apart from the third location, and a second portion movably and rotatably coupled to a second channel portion of the second channel structure.

12. The tonneau cover of claim 1 wherein the first gap is sized to enable one or more legs of a user seated on the first tonneau cover portion to extend therethrough.

13. The tonneau cover of claim 1 wherein the second gap is sized to enable one or more legs of a user seated on the second tonneau cover portion to extend therethrough.

14. The tonneau cover of claim 1 wherein the first, second, and third tonneau cover portions are structured and connected so that uppermost surfaces of the first, second, and third tonneau cover portions are substantially coplanar when the third tonneau cover portion is in the first configuration and the tonneau cover is mounted on the vehicle so as to cover the cargo bed.

15. The tonneau cover of claim 1 wherein the third tonneau cover portion has a first end structured to overlap a portion of the first tonneau cover portion when the third tonneau cover portion is in the first configuration, and a second end structured to overlap a portion of the second tonneau cover portion when the third tonneau cover portion is in the first configuration.

16. The tonneau cover of claim 1 further comprising one or more retractable ground legs mounted to each of the first tonneau cover portion and the second tonneau cover portion, the one or more retractable ground legs being structured to support the tonneau cover on a ground surface.

* * * * *